Nov. 16, 1937.                T. W. ROLPH                2,099,034
                              REFRACTOR
                        Filed April 25, 1935

INVENTOR.
Thomas W. Rolph.
BY
ATTORNEY.

Patented Nov. 16, 1937

2,099,034

UNITED STATES PATENT OFFICE 2,099,034

REFRACTOR

Thomas W. Rolph, Newark, Ohio, assignor to Holophane Company, Inc., New York, N. Y., a corporation of Delaware Application April 25, 1935, Serial No. 18,086

8 Claims. (Cl. 240—106)

The present invention relates to refractors for luminairs.

Prismatic refractors in the form of flat or substantially flat prismatic plates or lenses, bowls or the like are employed in luminairs for effecting light control so that the light is emitted in directions accurately determined by the prismatic design. Where these refractors are in the line of sight appearance is a factor to be considered in their design for faulty appearance impairs the usefulness of the refractor. It is not uncommon for these refractors to have spots which are of a comparatively high surface brightness at certain angles of observation outside the zone in which the rays are being concentrated, and these spots appear "hot". To improve the appearance, some form of diffusion producing means is usually resorted to. Where this is uniform, as for example, etching, it may be quite deep and the light control seriously interfered with, and where flutes, ribs and the like are employed the refractor may have a structural or architectural appearance which impairs its ornamental appeal.

The present invention contemplates means for producing a satisfactory degree of diffusion without substantially affecting the control of the light by prisms provided for that purpose. It also contemplates that this diffusion may be obtained by means which, instead of imposing undesirable appearance effects on the glass, actually improves its appearance.

The light diffusing means contemplated may be employed on refractors or lenses having parallel prisms, whether straight or curved, in the same plane or in different planes. It is embodied in the refracting medium, generally glass, on the surface opposite the prisms and takes the form of hollows or depressions in, or elevations or projections above, the generally smooth and continuous surface of the article. These are elongated in directions at right angles to the prisms and are concave or convex in both directions. Any one article may have either or both forms of diffusion producing means.

The accompanying drawing shows, for purposes of illustrating the present invention, several embodiments in which the invention may take form, it being understood that the drawing is illustrative of the invention rather than limiting the same. In this drawing.

Figure 1:
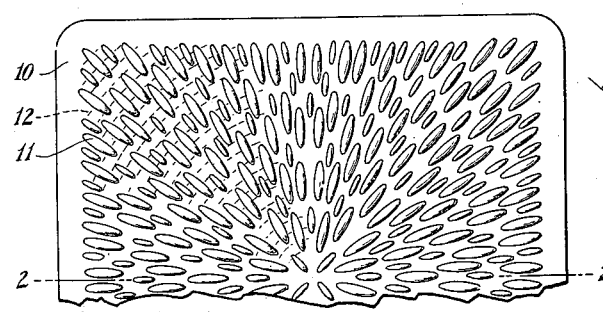
Fig. 1 is a plan view of a portion of a lens plate of the type having elevations or projections.

Lens plate 10 of Figure 1 is provided with convex elevations or projections 11 on one surface and a series of concentric prisms 12 on the opposite surface. These projections may be of uniform size or may be large and small as indicated in the drawing and are disposed about the surface of the plate more or less at random, but in all cases the major axis of the projection is at right angles to the opposed prism. The projections are preferably elliptical but may be oval. When the prisms are concentric as indicated in Figure 1 the convex projections are radial.

Figure 3:
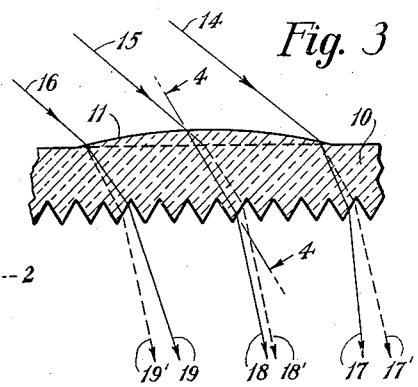
Fig. 3 is an enlarged longitudinal sectional view through one of the projections of Figure 2.
Figure 2:
Fig. 2 is a transverse sectional view on the line 2—2 of Figure 1.
Figure 4:
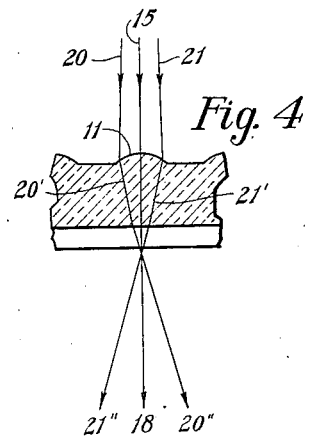
Fig. 4 is a transverse sectional view through such area taken on the line 4—4 of Figures 2 and 3.

Light rays from a source placed above the plate may fall on a projection as indicated in Figures 3 and 4. The rays 14, 15 and 16 which fall on the projection in the plane of its longitudinal axis are refracted as indicated in full lines and transmitted as indicated at 17, 18 and 19, respectively. They are emitted in directions determined largely by the prismatic configuration of the lower surface of the plate. In Figure 3 the dotted line indicates the continuous surface of the plate between projections. Rays having the same inclination to this surface as rays 14, 15 and 16 have paths indicated by the dotted lines 17', 18' and 19'. It will be noted that the direction in which the rays 17 and 19 are emitted is not substantially different from the direction of rays 17', and 19' and that rays 18 and 18' are parallel. The effect of the projections in the plane of Figure 3 is of no practical consequence. There is comparatively little diffusion in the plane of the prism action and hence the primary function of the plate, namely the concentration of the light, is not impaired.

In Figure 4 the paths of light rays in planes parallel with the minor axis of the ellipse are shown. The middle ray 15—18 is indicated as passing directly through the glass without deflection. Rays 20 and 21 which fall on the lateral portions of the projection are refracted as indicated at 20' and 21' and are transmitted in directions as indicated at 20" and 21". It will be noted that these rays cross and hence there is an appreciable amount of the diffusion of the light in the plane of Figure 4 which is transverse of the direction of action of the opposed prism elements.

Figure 5:
Fig. 5 is a sectional view similar to Figure 2 showing hollows or depressions in the light incident surface of the plate.
Figure 6:
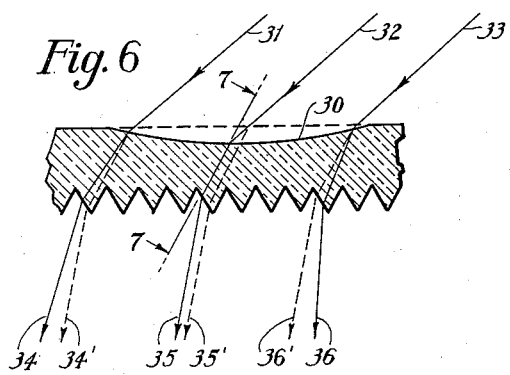
Fig. 6 is an enlarged longitudinal sectional view through one of the depressions of Figure 5.
Figure 7:
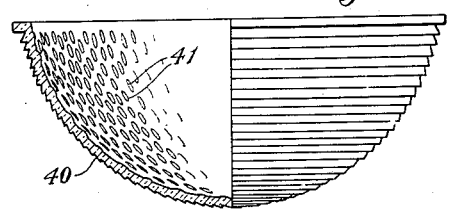
Fig. 7 is a transverse sectional view on the line 7—7 of Figures 5 and 6.

In Figures 5, 6 and 7 plates are indicated as having hollows or depressions 30. These may be elliptical or oval recesses with their major axes at right angles to the opposed prisms. The path of light rays in the plane of the longitudinal axis of a depression 30 is indicated in Figure 6. The incident light rays 31, 32 and 33 falling on the area of the depression are refracted by the glass and transmitted in directions indicated at 34, 35 and 36. Light rays falling on the continuous surface of the plate between the depressions and at the same angles as rays 31, 32 and 33 refracted as indicated in the dotted lines of Figure 6 and transmitted as indicated by the dotted lines 34', 35' and 36' in directions which do not materially differ from the directions of the rays which pass through the depression. The depression has therefore little effect on the spread of the beam in this plane.

In Figure 7 the path of the middle light ray 32—35 is straight, and hence there is no lateral deviation of the rays passing through the center of the depression. Rays such as 37 and 38 are refracted and transmitted as indicated at 37' and 38'. It will be seen that these rays diverge in the same way as the rays illustrated in Figure 4.

Figure 8:
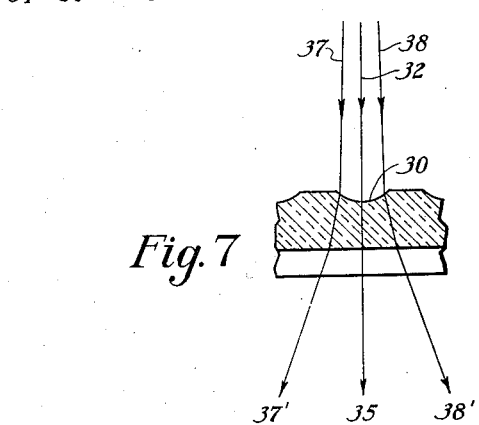
Fig. 8 illustrates the application of the diffusion means to a bowl refractor.

Figure 8 illustrates a refracting bowl having external parallel prisms 40 and internal depressions or projections indicated at 41. These are preferably elliptical and are arranged with their longitudinal axis at right angles to the opposed prisms and function as above described.

Refractors employing the diffusion producing means above described provide a very useful degree of diffusion in directions lateral to the major axis of the depression or projection and when these elements are scattered over the surface of the lens as above described this lateral diffusion takes place throughout a substantial area of the lens surface so that diffusion in all directions may be obtained without, however, substantially affecting the operation of the prisms to control the spread of the dominant beams.

As a result of the use of these bumps or depressions the refractor has an attractive sparkling appearance without spots of high intensity. Owing to the way in which the elliptical areas may be scattered about the surface of the refractor the desired light controlling results may be had without introducing any architectural design such as would be the case with diffusing flutes or ribs.

It is obvious that the invention may be embodied in many forms and constructions within the scope of the claims, and I wish it to be understood that the particular forms shown are but a few of the many forms. Various modifications and changes being possible, I do not otherwise limit myself in any way with respect thereto.

What is claimed is:

1. A refractor for altering the divergence of light rays, said refractor having a substantially continuous surface on the light incident side and a series of parallel prisms on the opposite side, the light incident side having comparatively small, spaced apart areas departing from the otherwise continuous surface, said areas being elongated in directions transverse of the opposed prisms and of curved cross section longitudinally and transversely for diverging light incident on each area in directions parallel with the minor axis of said area and without substantially affecting the converging of light rays by the opposed prisms in directions parallel with the major axis of said area.

2. A refractor for altering the divergence of light rays, said refractor having a substantially continuous surface on the light incident side and a series of parallel prisms on the opposite side, the light incident side having comparatively small, spaced apart elliptical areas departing from the otherwise continuous surface, major axes of said areas being in directions transverse of the opposed prisms, each area being of curved cross section longitudinally and transversely for diverging light incident thereon in directions parallel with the minor axis of said area and without substantially affecting the converging of light rays by the opposed prisms in directions parallel with the major axis of said area.

3. A refractor for altering the divergence of light rays, said refractor having a substantially continuous surface on the light incident side and a series of parallel prisms on the opposite side, the light incident side having comparatively small, spaced apart projections above the otherwise continuous surface, said projections being elongated in directions transverse of the opposed prisms and of curved cross section longitudinally and transversely for diverging light incident on each projection in directions parallel with the minor axis of the projection and without substantially affecting the converging of light rays by the opposed prisms in directions parallel with the major axis of said projection.

4. A refractor for altering the divergence of light rays, said refractor having a substantially continuous surface on the light incident side and a series of parallel prisms on the opposite side, the light incident side having comparatively small, spaced apart depressions in the otherwise continuous surface, said depressions being elongated in directions transverse of the opposed prisms and of curved cross section longitudinally and transversely for diverging light incident on each depression in directions parallel with the minor axis of the depression and without substantially affecting the converging of light rays by the opposed prisms in directions parallel with the major axis of said depression.

5. A refractor for altering the divergence of light rays, said refractor having a substantially continuous surface on the light incident side and a series of concentric prisms on the opposite side, the light incident side having comparatively small, spaced apart areas departing from the otherwise continuous surface, said areas being elongated in radial directions of curved cross section longitudinally and transversely for diverging light incident on said area in directions parallel with the minor axis of said area and without substantially affecting the converging of light rays by the opposed prisms in directions parallel with the major axis of said area.

6. A refractor as claimed in claim 5, wherein said areas are elliptical.

7. A refractor as claimed in claim 5, wherein said areas are arched above the otherwise continuous surface.

8. A refractor as claimed in claim 5, wherein said areas are recessed below the otherwise continuous surface.

THOMAS W. ROLPH.